United States Patent

Noro

Patent Number: 5,459,650
Date of Patent: *Oct. 17, 1995

[54] POWER SUPPLY CIRCUIT

[75] Inventor: Masao Noro, Hamamatsu, Japan

[73] Assignee: Yamaha Corporation, Japan

[ * ] Notice: The portion of the term of this patent subsequent to May 31, 2011 has been disclaimed.

[21] Appl. No.: 950,915

[22] Filed: Sep. 24, 1992

[30]     Foreign Application Priority Data

Sep. 25, 1991   [JP]   Japan .................... 3-273144

[51] Int. Cl.⁶ .................................. H02M 3/335
[52] U.S. Cl. ................ 363/24; 363/134; 363/16
[58] Field of Search ............ 363/16, 17, 24–26, 363/97, 98, 131, 132, 22, 23, 133, 134

[56]           References Cited

U.S. PATENT DOCUMENTS

| 4,115,742 | 9/1978 | Yokoyama | 330/297 |
|---|---|---|---|
| 4,336,587 | 6/1982 | Boettcher, Jr. et al. | 363/134 |
| 4,378,530 | 3/1983 | Garde | 330/297 |
| 4,430,625 | 2/1984 | Yokoyama | 330/297 |
| 4,472,687 | 9/1984 | Kashiwagi et al. | 330/297 |
| 4,498,057 | 2/1985 | Noro | 330/297 |
| 4,507,619 | 3/1985 | Dijkstra et al. | 330/297 |
| 4,516,080 | 5/1985 | Garde | 330/3 |
| 4,523,152 | 6/1985 | Garde | 330/151 |
| 4,660,136 | 4/1987 | Montorefano | 363/26 |
| 4,706,252 | 11/1987 | Egawa et al. | 372/38 |
| 4,823,249 | 4/1989 | Garcia, II | 363/48 |
| 4,823,249 | 4/1989 | Garcia, II | 363/48 |
| 4,920,474 | 4/1990 | Bruning et al. | 363/97 |
| 5,073,849 | 12/1991 | Morris | 363/21 |
| 5,132,889 | 7/1992 | Hitchcock et al. | 363/17 |
| 5,157,593 | 10/1992 | Jain | 363/17 |
| 5,159,541 | 10/1992 | Jain | 363/26 |
| 5,166,869 | 11/1992 | Hesterman | 363/25 |
| 5,317,494 | 5/1994 | Noro | 363/18 |

FOREIGN PATENT DOCUMENTS

2-49212   5/1990   Japan .

Primary Examiner—Peter S. Wong
Assistant Examiner—Adolf Berhane
Attorney, Agent, or Firm—Graham & James

[57]             ABSTRACT

A transformer has a secondary winding with an intermediate tap. Two switching elements are connected in series between terminals of the primary winding. A dc power source is connected between a connecting point of the switching elements and the intermediate tap of the primary winding. By turning on and off the switching elements alternately, parallel resonance is produced by primary self inductance and a capacitor provided on the primary side of the transformer. Series resonance is produced by leakage inductance between the primary and secondary sides and a capacitor provided on the secondary side. Turning on of the switching elements at a zero-voltage state and turning off of the switching elements at a zero-current state are realized. Since this transformer is a push-pull type one, currents flowing through the switching elements are reduced to half of a half bridge type transformer.

2 Claims, 6 Drawing Sheets

POWER SUPPLY CIRCUIT

BACKGROUND OF THE INVENTION

This invention relates to a power supply circuit of a switching inverter type capable of reducing switching loss to the maximum and improving conversion efficiency by utilizing both voltage resonance and current resonance and, more particularly, to a power supply circuit of this type wherein current flowing through switching elements is reduced and thereby heat generation is reduced.

As a power supply circuit intended to reduce switching loss to the maximum and improving conversion efficiency by utilizing both voltage resonance and current resonance, there is the applicant's co-pending U.S. patent application Ser. No. 7/896,214.

Description will be made about this power supply circuit below. This power supply circuit aims at reducing switching loss to the maximum and improving conversion efficiency by utilizing both voltage resonance and current resonance as well as reducing noise by enabling operation waveforms of voltage and current appearing at respective component parts of the circuit to simulate a sine wave to a maximum degree.

Figure 2:
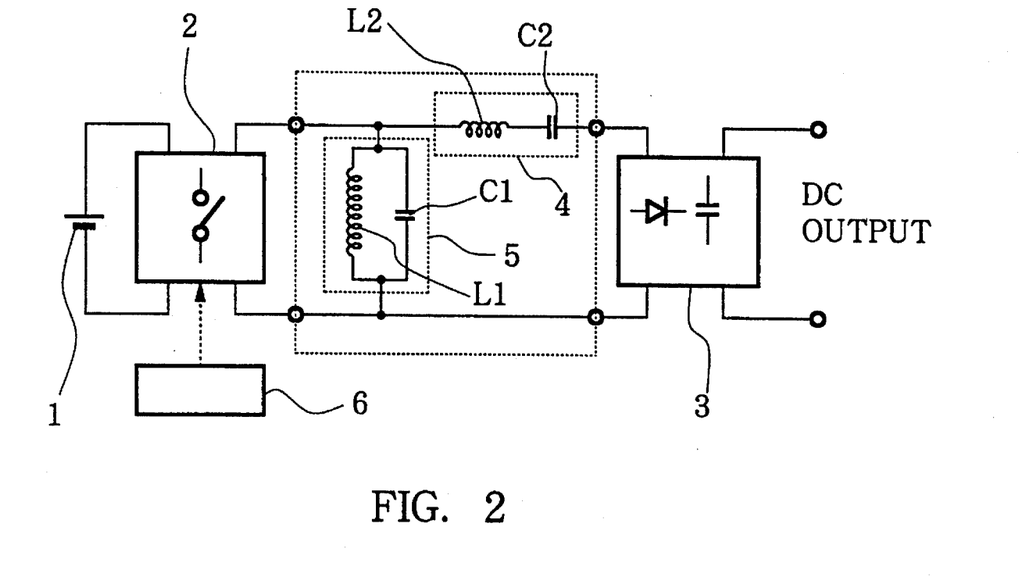
FIG. 2 is a block diagram showing schematically a basic principle of the power supply circuit described in U.S. patent application Ser. No. 7/896,214.

This power supply circuit includes, as shown in FIG. 2, a dc power source 1, switching means 2 including switching elements which are turned on and off at desired timing, switching a dc input from the dc power source 1 to convert it to ac and providing it as an ac output from an output terminal thereof, series resonance means 4 provided in series to current flowing, from the output terminal of the switching means 2, parallel resonance means 5 provided in parallel to voltage produced at the output terminal of the switching means 2, dc output means which full-wave rectifies and smoothes an ac input supplied through the series resonance means 4 and the parallel resonance means 5 to provide a dc output, and switching control means 6 which controls the switching elements of the switching means 2 so that the switching elements turn on respectively intermittently.

Figure 3:
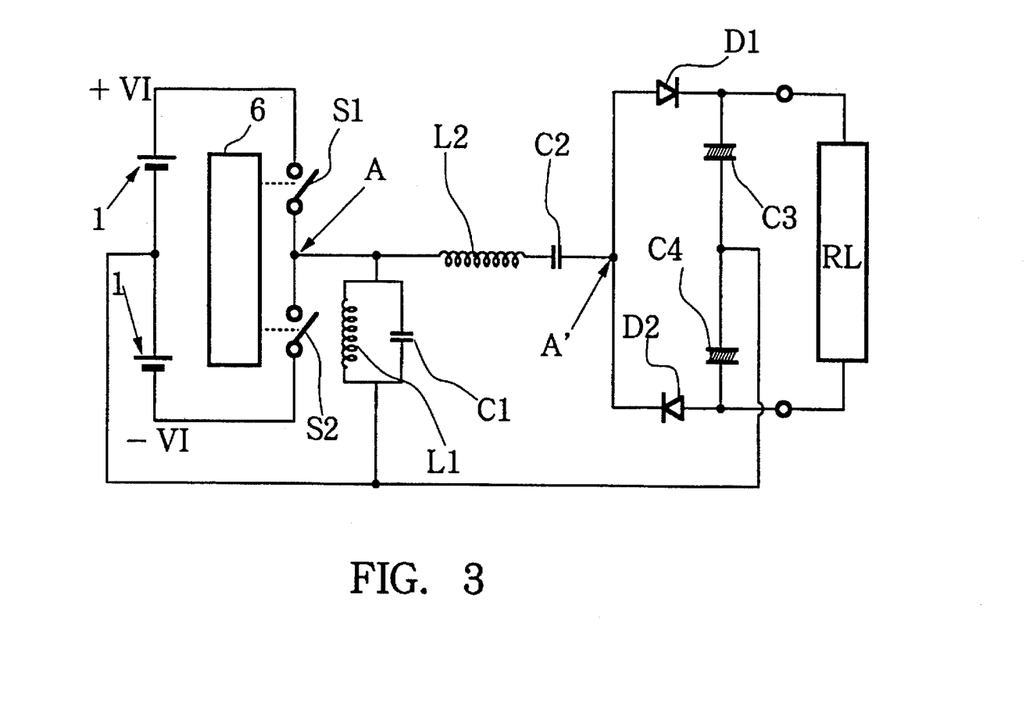
FIG. 3 is a circuit diagram showing a basic construction of the power supply circuit of FIG. 2.

FIG. 3 is a circuit diagram showing the basic construction of the power circuit of the invention shown in FIG. 2 somewhat more specifically. The operation of the basic construction of FIG. 3 will be described with reference to the flow chart of FIG. 4.

Figure 4:
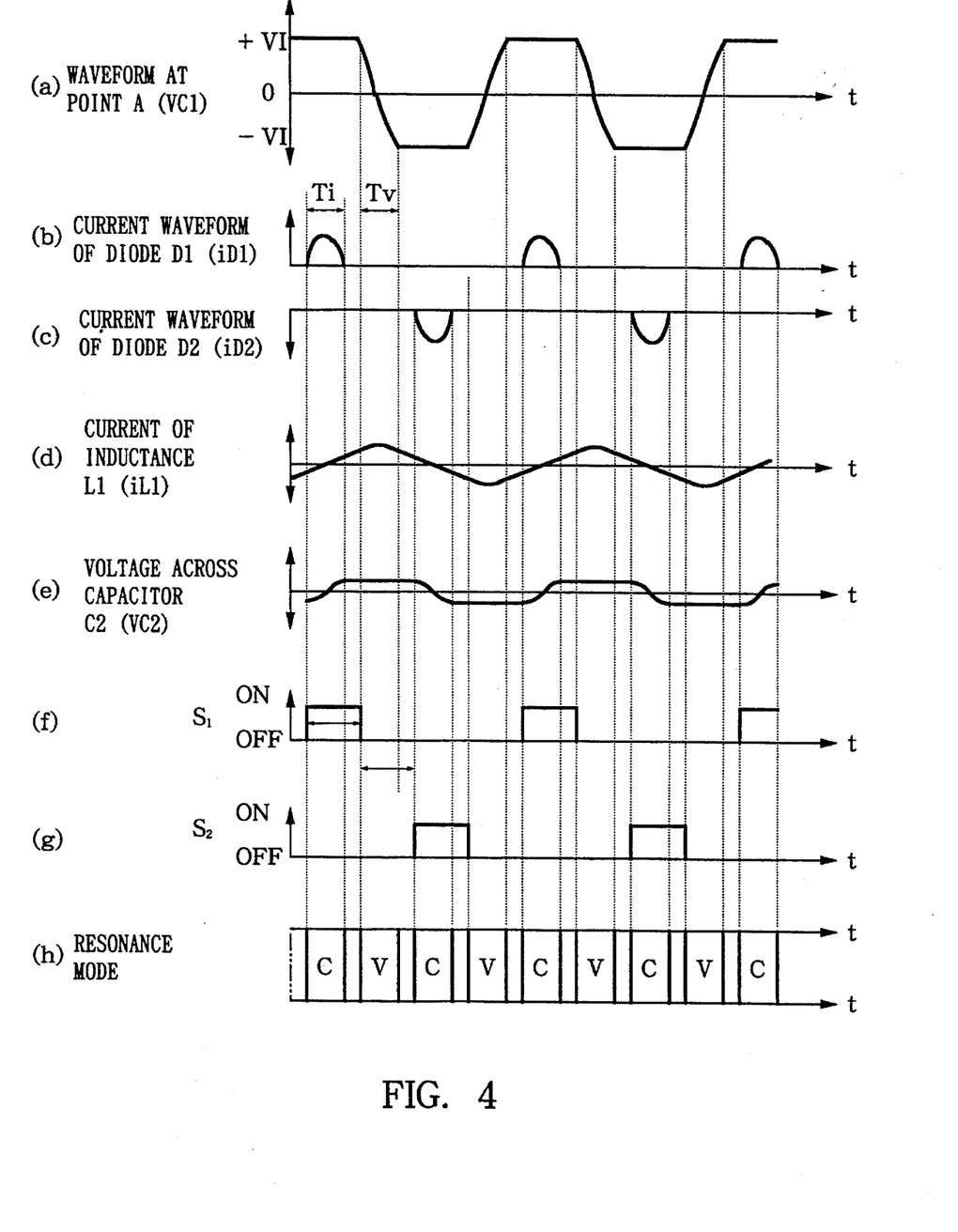
FIG. 4 is a time chart for explaining operation of the basic construction of FIG. 3.

When switching elements S1 and S2 are being turned on and off repeatedly at a timing shown in (f) and (g) of FIG. 4, power source voltages +VI, −VI are converted into ac having substantially a peak value of VI at a point A of the circuit of FIG. 3. This ac is rectified by diodes D1 and D2 through an inductance L2 and a capacitor C2. The rectified signal is smoothed by capacitors C3 and C4 to become dc and the dc current flows through a load RL. As the diodes D1 and D2 and the capacitors C3 and C4, the elements of substantially the same characteristics are used.

When the switching element S1 is in the on state, the diode D1 is in a forward direction so that charge current iD1 flows to the capacitor C3. Since a relation that the capacitor C3 is much larger than the capacitor C2 (C3>>C2) and impedances of the switching element S1 and the diode D1 are sufficiently small is established, this current iD1 becomes series resonance current of a sine waveform due to the inductance L2 and the capacitor C2 (see (b) of FIG. 4). Since reverse voltage is applied to the diode D1 and the diode D1 is turned off when the direction of reverse current is reversed upon lapse of half cycle, series resonance is stopped. In other words, when the resonance current has finished its half cycle and has become zero, the resonance is automatically stopped.

At this time, charge corresponding to the resonance current which has flown to this time point has been accumulated in the capacitor C2 and voltage VC2 across the capacitor C2 remains (see (e) of FIG. 4). Since this charge QC2=C2·VC2 is discharged to the load during a next cycle during which the switching element S2 is on state and, therefore, there is no energy loss. Since energy stored in inductance is proportional to current flowing through the inductances, energy stored in the inductance L2 is zero when the resonance has stopped at the current zero state. This signifies that generation of harmful noise in this circuit portion is very small and also signifies an important condition under which a voltage resonance mode is established.

In order to reduce the magnetic energy of the inductance L2 completely to zero, it is necessary to keep the switching element S1 in the on state until the resonance current has become zero. It will be no use to keep the switching element S1 in the on state after the resonance current has become zero but it will be inefficient to simply prolong a time period during which energy is not transmitted. The switching element S1 therefore may be turned off with some allowance of time (TQ1−Ti). Since the resonance time (a cycle of resonance current) by the inductance L2 and the capacitor C2 is constant, a time period during which the switching element S1 is on state may also be a constant value.

When the switching element S1 is turned off, the current resonance has already finished and the current becomes zero and, therefore, current flowing through the switching element S1 at this time is only current flowing to the inductance L1. The value of the inductance L1 can be set independently from the values of the inductance L2 and the capacitor C2 and, by establishing a relation that inductance L1 is much larger than inductance L2 (L1>>L2), current flowing through the inductance L1 can be of a value sufficiently smaller than the resonance current of the inductance L2 and the capacitor C2 and, therefore, the switching element S1 is turned off in a nearly zero current state and, as a result, loss in turning off of the switching element S1 is extremely small. When the switching element S1 is turned off (since the switching element S2 has not been turned on, both switching elements S1 and S2 are off), the diodes D1 and D2 are also off and, therefore, the elements which are in electric operation at this time are only the inductance L1 and the capacitor for C1.

Magnetic energy (current) stored in the inductance L1 during the on state of the switching element S1 constitutes energy which operates parallel resonance with the capacitor C1 which causes voltage at the point A to drop in a sine wave form and approach the potential −VI exceeding the zero point. The operation performed during this time period is the voltage resonance mode. The voltage resonance waveform in principle assumes a form as shown in (a) of FIG. 4 which is a vertically symmetrical form with respect to a point crossing the reference potential (i.e., the potential designated by "0" in (a) of FIG. 4). Depending, however, upon an actual circuit design, deformation will take place (e.g., a case where a timing control circuit to be described later consumes a part of energy of voltage resonance through its windings.

When the potential at the point A has dropped to nearly −VI (i.e., below the potential at one end of capacitor C4), the diode D2 is turned on and thereby causes energy charged in the capacitor C4 to discharge to inductance L1 through the diode D2, the capacitor C2 and the inductance L2. Since the current flowing through the inductance L1 is set a small value, a large change in the current value does not take place but the potential at the point A remains at a value near −VI. If the switching elements S1 and S2 are kept in the off state, the magnetic energy (current) of the inductance L1 will be reduced to zero in a time length which is about half of the time period during which the switching element S1 is on and voltage across the inductance L1 (or capacitor C1) drops from the potential near −VI to zero. Alternatively stated, since the point A can be held at the potential near −VI by the magnetic energy of the inductance L1 during about half of the time period during which the switching element S1 is on, if the switching element S2 is turned on within this time period, it can perform a switching-on operation in a state where voltage across the switching element S2 is extremely small. Loss during the switching-on of the switching element S2 therefore is extremely small.

The voltage across the switching element S2 when it is turned on (i.e., difference between the above described potential near −VI and −VI) is exactly not zero but there exists voltage due to Vc2 (which is voltage across the capacitor C2) left after the current resonance during the on state of the switching element S1. The voltage Vc2 becomes a different value depending upon the value of the capacitor C2. Since the value of C2 can be set with a relatively large degree of freedom in relation to the inductance L2 and loss is generally smaller when the value of C2 is large and the value of L2 is small within a range in which series resonance can take place, the value of voltage VC2 consequently becomes small which can be almost neglected as compared with the voltage VI.

Upon turning on of the switching element S2, current resonance on the negative side takes place with a result that charge current flows to the capacitor C4. Subsequently, as shown in FIG. 3, the above operation is repeated with the switching elements S1 and S2 taking their place in turn.

Time between turning off of the switching element S1 and turning on of the switching element S2 may be set at a slightly longer time length than a time period during which the point A reaches the potential near −VI due to the voltage resonance by the inductance L1 and capacitor C1 after turning off of the switching element S1. It will be inefficient as well to take a longer time. This time period need not be set so strictly but a certain fixed value may be used.

Some more consideration will be given for the time period during which the switching elements S1 or S2 is on and the time period from turning off of the switching element S1 or S2 till turning on of the switching element S2 or S1. It may be basically said that the on period of each switching element should be set to a longer period than half cycle of resonance of the series resonance means and the off period of both switching elements should be set to a shorter period than half of the resonance period of the parallel resonance means. In this case, consideration should however be given to the amount of energy which is previously given to the voltage resonance circuit of the inductance L1 and the capacitor C1 before starting the voltage resonance mode. Consideration should also be given to the manner of determining values of the inductance L1 and the capacitor C1 even when the parallel resonance frequency is set at a certain value. The on period of each switching element determines the amount of the given energy and the off-period of both switching elements should be limited to determine by the given energy (i.e., the value corresponding to the on period). According to analysis made by the inventor, it has been found that, in actuality, once the on period and the off period have been determined, the switching frequency is determined at this time and the parallel resonance (voltage resonance) frequency satisfying the operation of this invention and a usable portion of the parallel resonance waveform are solely determined. When, for example, the on period is set to infinite small (substantial zero), the voltage resonance waveform in this case seems to change substantially in the shape of a sine waveform with substantially the same frequency as the switching frequency. It should be noted, however, that, in some cases, a desired output terminal voltage change of 2VI is not realized notwithstanding that the voltage resonance has reached its peak value.

Further, as will be apparent from the above description, it is desirable that there should be the relations L1>>L2 and C2>>C1 as condition for setting the values of the respective resonance circuits. The rectification should be made by the full-wave rectification system. As the smoothing system, a capacitor input system should be used for the current resonance. The capacity of the smoothing capacitors C3 and C4 should be much larger than the capacitor used in the series resonance means 4 so as to prevent decrease in Q of the current resonance.

In realizing the above described basic construction as a specific circuit, as will be apparent from the above described principle, the relations L1>>L2 and C2 >>C1 are desirable as actual condition for setting values of the respective resonance circuits. For satisfying these relations, primary self inductance of the transformer is effectively used as L1, an independent inductance or leakage inductance between the primary and the secondary of the transformer is used as L2. Since the rectifying circuit is positioned on the secondary side of the transformer, either a center tap type rectifying circuit or a bridge type one may be used. In any case, it must be a full-wave rectifying circuit because the current resonance must be performed with both positive and negative currents. As the smoothing circuit, a capacitor for input type circuit is used for the current resonance and the relation C3>>C2 is maintained so as to prevent drop of Q (quality) factor in the current resonance.

Figure 5:
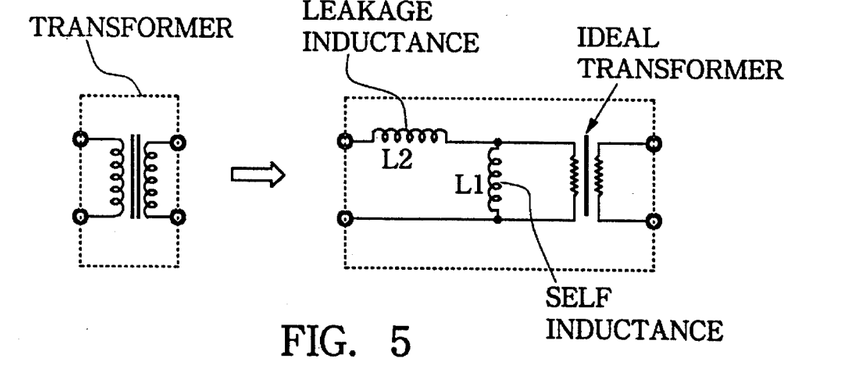
FIG. 5 is a diagram for explaining an equivalent circuit of a transformer.

The transformer viewed from the primary side is shown in FIG. 5. Since the transformer has self inductance and leakage inductance, these inductances may be utilized as L1 and L2 of FIG. 2 by properly setting the values of these inductances in the circuit design. In a general transformer, the relation L1>L2 is satisfied.

Figure 6:
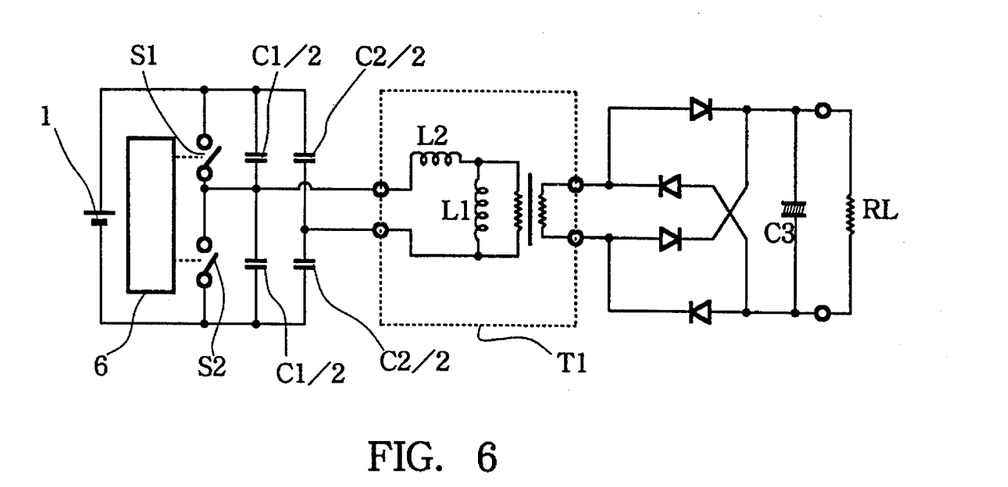
FIG. 6 is a circuit diagram for explaining a modified example of the basic construction of the FIG. 3.

The basic circuit of FIG. 3 can be modified in the form shown in FIG. 6. In FIG. 6, the current resonance is performed by the inductance L2 and the capacitor C2 which is divided in two capacitors whereas the voltage resonance is performed by the inductance L1 and the capacitor C1 which is divided in two capacitors and the inductance L1. The circuit of FIG. 5 may seem to be different from the circuit of FIG. 2 in that the loop of the voltage resonance includes both the inductance L2 and the capacitor C2 but since there are the relations L2<<L1 and C2>>C1, the presence of L2 and C2 does not substantially affect the voltage resonance and, accordingly, the voltage resonance is virtually performed by the capacitor C1 and the inductance L1 in the same manner as in the circuit of FIG. 3.

Figure 7:
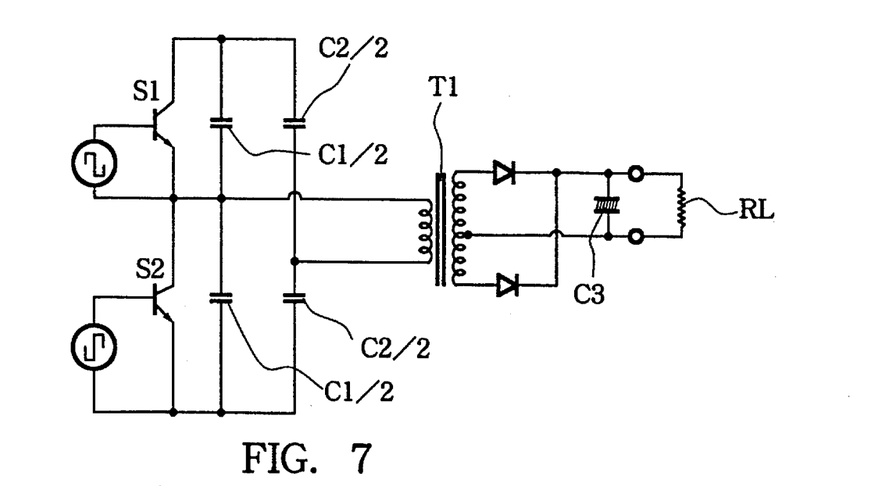
FIG. 7 is a circuit diagram showing an embodiment which is a modified form of the basic construction of FIG. 3.

FIG. 7 shows a more specific circuit using a transformer T1 having self inductance L1 and leakage inductance L2. The center tap type output circuit is used as the output circuit. The center tap winding is adopted because the number of diodes in the rectifying path in each rectifying cycle thereby can be reduced and, as a result, loss due to these diodes can be held to the minimum and efficiency of the circuit as a whole can be improved. Further, two transistors are utilized as the switching elements S1 and S2.

Each transistor is switched by a driving circuit having a fixed switching timing as shown in (f) and (g) of FIG. 4. Accordingly, a power supply circuit with low noise and high efficiency can be realized by a simple construction.

Benefits derived from the above described power supply circuit are summarized as follows:

First, as an advantageous result of the current resonance, noise due to current is reduced. The current noise is produced in a large amount particularly when an abrupt change in current takes place in a portion where a large current flows. The current resonance automatically stops when the current which changes in the shape of a sine wave has been reduced to zero and, therefore, very little noise is generated. As to the improvement of efficiency, the switching elements S1 and S2 are turned off at the current zero state and voltage through the diodes D1 and D2 is also reversed after the current has been reduced to zero, so that the adverse effect to the efficiency during the recovery time is reduced.

Advantageous results of the voltage resonance also are reduction of noise and improvement of efficiency of the circuit as a whole. Since parts such as semiconductors used in the power supply circuit are mounted on a chassis through an insulating material for heat radiation, part electrode and the chassis have electrostatic capacity. The part electrode is provided with an ac signal and, accordingly, current flows to this capacity which becomes a main cause of a common mode noise. The semiconductors have also a junction capacity and the inductances and transformer also have line capacity. These capacities do not appear in the circuit diagram but actually exist in the respective parts and the circuit board and, therefore, current flows to all these capacities when the circuit is in operation. Since this current is one flowing to the capacity, it becomes larger when change in the voltage (dV/dT, i.e., ratio of change in voltage V to time T) is larger. When switching is made with a square wave, this current becomes a pulse-like current and generates a current noise. Current flowing to the chassis causes a pulse-like common mode noise. Since this pulse-like current is supplied to the switching transistors, loss in the switching transistors is produced with resulting decrease in the efficiency. Besides, since voltage having a large dV/dT contains a high frequency component, a radio wave radiated directly from the circuit (unnecessary radiation) also becomes large.

By using the voltage resonance using a waveform approximating a sine wave and reducing dV/dT, these problems can be overcome. According to the invention, the voltage resonance is performed by the inductance L1 and the capacitor C1 only when both the switching elements S1 and S2 are both on and, therefore, loss in the switching elements S1 and S2 is not produced. The current flowing through the inductance L1 and the capacitor C1 is mere transfer of mutual energy so that only reactive power is consumed and loss due to the voltage resonance is very small (theoretically zero).

For reducing a voltage type noise, it is important that dV/dT of voltage waveforms at all terminals of the circuit is negligibly small. If there is a square wave at one terminal only, it will become a noise source. Power circuits of a conventional voltage resonance type mostly contain square waves (in circuit portions other than a transformer output), though they have a sine wave at one spot in the circuit (e.g., in the transformer output). It is a final object of this invention to realize a practical low-noise power circuit and it is a feature of the invention that all voltage waveforms are similar to the voltage resonance waveform by the inductance L1 and the capacitor C1. This is achieved by performing the voltage resonance at a different time from the current resonance. That is, after reducing currents of the switching elements S1 and S2 and the diode D2 to zero and reducing also the magnetic energy of the inductance L2 to zero by the current resonance, the voltage resonance is started and, by bringing the switching elements S1 and S2 and the diodes D1 and D2 in an off state and thereby reducing current in the inductance L2 and the capacitor C2 in the voltage resonance mode to zero, the waveform at the point A and the waveform at the point A' become similar to each other. The terminal voltage waveforms of the inductance L1 and the capacitor C1 thereby become similar to the terminal waveforms of the switching elements S1 and S2, inductance L2, capacitor C2, and diodes D1 and D2 and a square wave disappears from the circuit.

The structure shown in FIGS. 6 and 7 is a half bridge type structure in which half of voltage across the dc power source on the input side is always applied to the primary side of the transformer. In this type of transformer, when a desired output voltage is to be provided, current flowing to the primary side of the transformer relatively increases with resulting increase in current flowing to the switching elements S1 and S2 which sometimes causes a problem of heat generation.

It is, therefore, an object of the invention to provide a power supply circuit capable of reducing current flowing to the switching elements and thereby capable of preventing generation of heat.

SUMMARY OF THE INVENTION

A power supply circuit achieving the above described object of the invention comprises a transformer having a primary winding with an intermediate tap, a switching circuit having two switching elements connected in series between terminals of the primary winding, a dc power source connected between a connecting point of the two switching elements and the intermediate tap of the transformer, dc output means for producing a dc output by rectifying and smoothing a secondary output of the transformer, parallel resonance circuit comprising a primary self inductance of the transformer and a capacitor provided on a primary side of the transformer and being formed in parallel to voltage produced at an output terminal of the switching circuit, series resonance circuit comprising a leakage inductance between primary and secondary sides of the transformer and a capacitor provided on a secondary side of the transformer and being formed in series to current flowing to the output terminal of the switching circuit, and switching control means for turning on and off the two switching elements of the switching circuit alternately and intermittently, wherein adc output is provided from resonance current of the series resonance means by the dc output means and potential at the output terminal of the switching circuit is caused to change from one potential to another by using parallel resonance voltage of the parallel resonance means so that switching operations of the switching elements of the switching circuit are performed substantially at a zero-voltage state or a zero-current state and harmonic contents contained in operating voltage and operating current are respectively reduced.

According to the invention, the power supply circuit becomes a push-pull type so that all voltage across the dc power source on the input side always is applied to the primary side of the transformer and, accordingly, when an output power of the same magnitude as can be provided by the half bridge type transformer is to be provided from the secondary side, current flowing to the switching elements becomes half of the half bridge type transformer whereby generation of heat in the circuit can be effectively prevented.

Embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1:
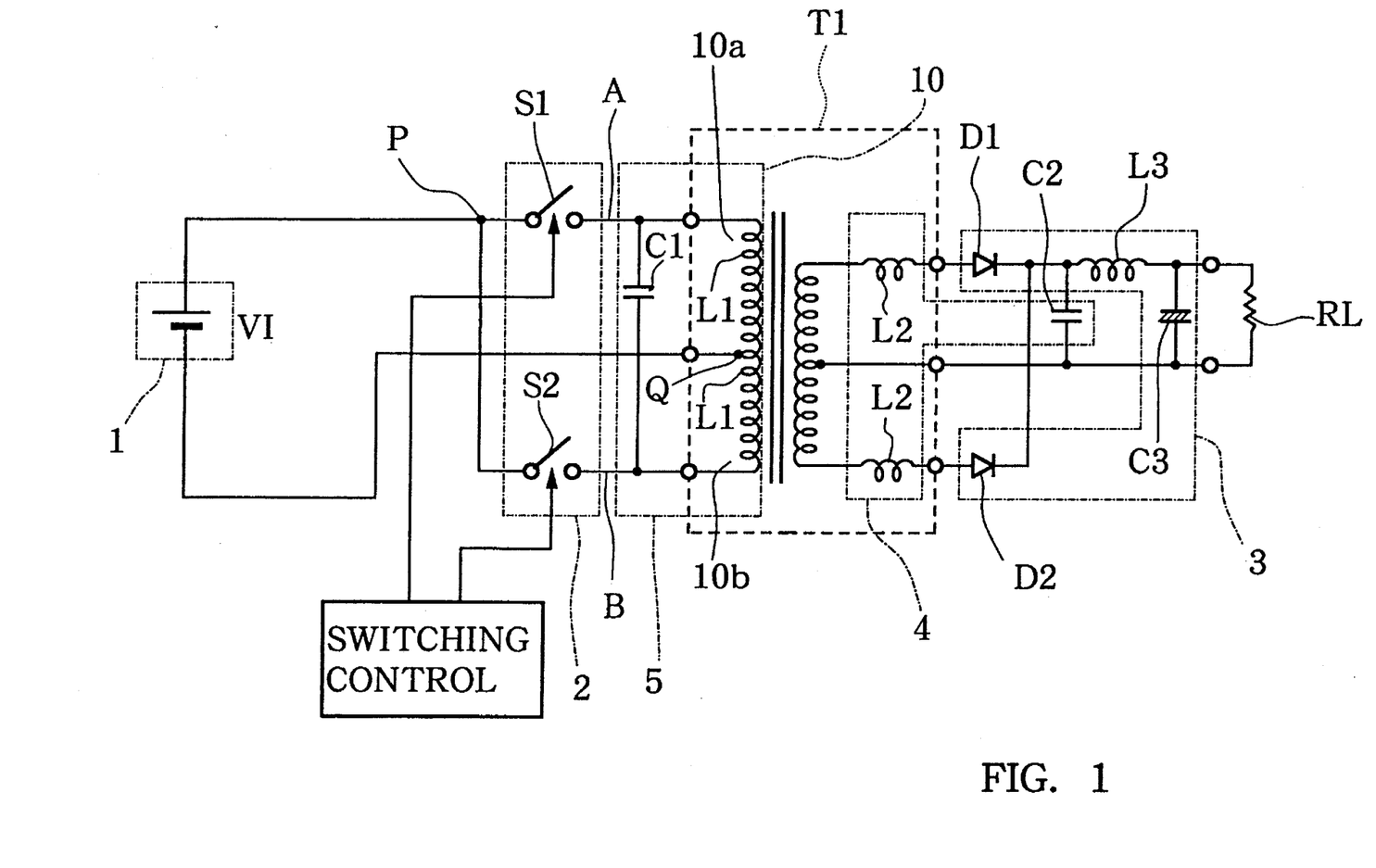
FIG. 1 is a circuit diagram showing an embodiment of the invention.

FIG. 1 shows an embodiment of the power supply circuit according to the invention.

The power supply circuit includes a transformer T1. This transformer T1 includes a primary winding 10 with an intermediate tap. Switching means 2 including switching elements S1 and S2 connected in series is provided between terminals of the primary winding 10. A dc power source 1 is connected between a connecting point P of the switching elements S1 and S2 and the intermediate tap Q of the primary winding 10. The dc power source is constructed of, e.g., a power source which can obtain a dc voltage by rectifying and smoothing a commercial ac power source or a battery.

Parallel resonance means 5 includes a primary mutual inductance L1 and a capacitor C1. Series resonance means 4 includes a leakage inductance L2 between the primary and secondary sides of the transformer T1 (a value as viewed from the secondary side) and a capacitor C2. In a push-pull type transformer in which there is no substantial ac voltage on the primary side, it is not possible to provide series resonance means including a capacitor connected in series on the primary side of the transformer. In this embodiment, this problem is overcome by providing the series resonance means on the secondary side.

Series output means 3 includes diodes D1 and D2, a smoothing inductance L3 and a smoothing capacitor C3. Voltage across the smoothing capacitor C3 is provided as a dc output and supplied to a load RL. The value of L3 is set at L3>>L2 so as not to give influence to current resonance.

A timing switching circuit 6 is provided for turning on and off the switching elements S1 and S2 alternately and intermittently.

Figure 8:
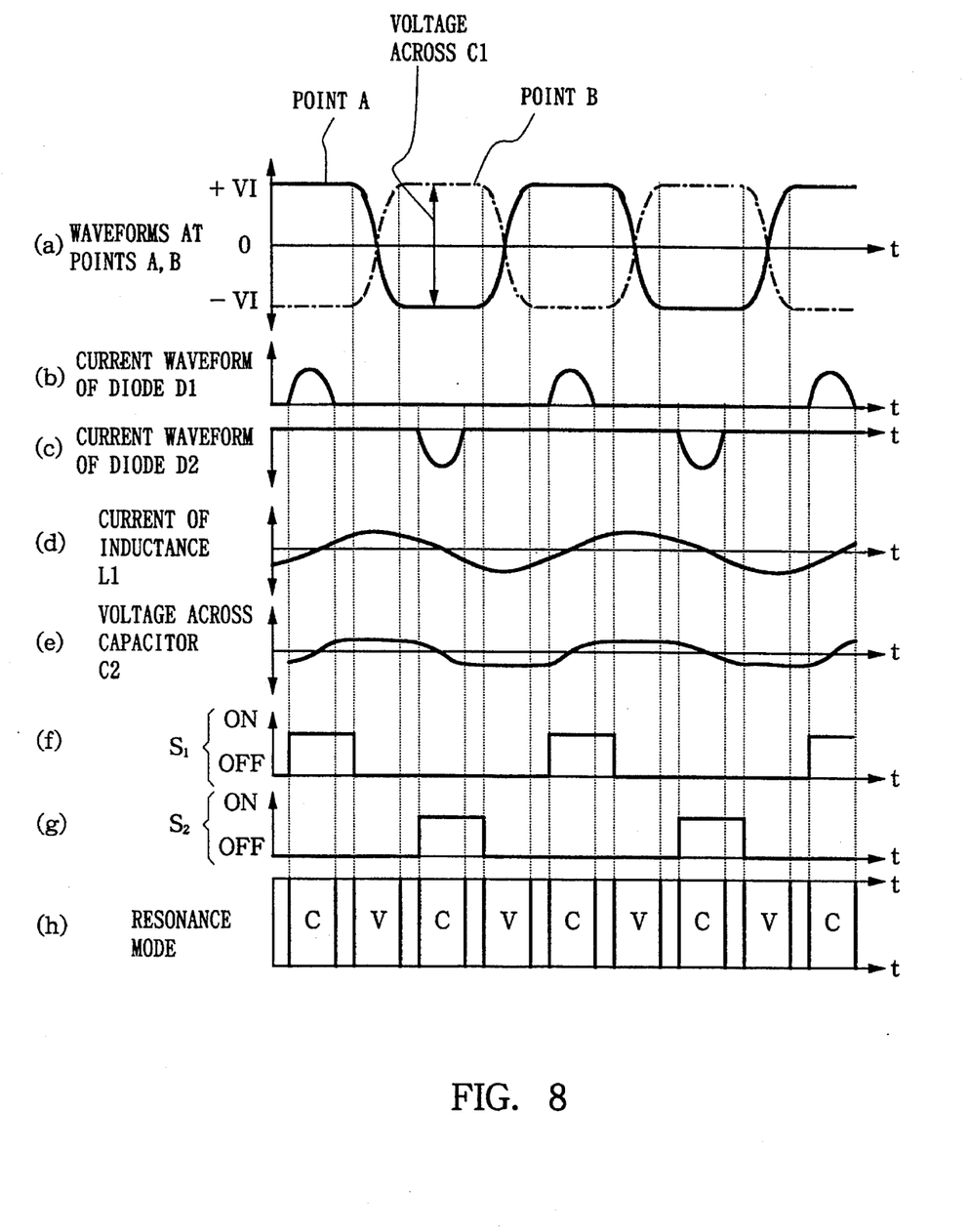
FIG. 8 is a diagram showing waveforms of operation of the power supply circuit of FIG. 1.

Operation of the power supply circuit of FIG. 1 will now be described with reference to FIG. 8 showing operation timings of the respective parts of the circuit. The switching elements S1 and S2 repeat turning on and off at timings shown in (f) and (g) of FIG. 8 thereby supplying a dc voltage V1 alternately to primary windings 10a and 10b of the transformer T1.

When the switching element S1 is on, the diode D1 is in a forward direction so that a charge current flows to the switching element S1. Since, however, impedance of the switching element S1 and the diode D1 is sufficiently small and the inductances L3 and L2 are set at L3>>L2, sinusoidal series resonance current is produced due to the leakage inductance L2 between the primary and secondary sides of the transformer T1 and the capacitor C2 (see (a) of FIG. 8). This series resonance ceases when a half cycle has elapsed because the direction of current is reversed at this point and the diode D1 is turned off because of reversing of the voltage applied thereto. That is, when a half cycle has elapsed and the current has been reduced to zero, the series resonance is automatically ceased.

Since the current resonance has ceased and the current has been reduced to zero when the switching element S1 is turned, off, current flowing through the switching element S1 is only current flowing to the inductance L1. The value of the inductance L1 can be set independently from L2 and C2 and can be set at a sufficiently small value compared with resonance current by the L2 and C2 by setting the inductances L1 and L2 at L1>>L2, so that the switching element S1 is turned off substantially at a zero-current state whereby loss during the off time becomes very small. When the switching element S1 has been turned off (both the switching elements S1 and S2 are off in this state because the switching element S2 has not been turned on yet), the diodes D1 and D2 are both off and, therefore, component parts which are in operation in this state are only the inductance L1 and the capacitor C1. When the switching element S1 is turned off, voltage across the capacitor C1 is 2VI (the high side is positive and the low side is negative).

Magnetic energy (current) stored in the inductance L1 while the switching element S1 is on is used as energy for causing parallel resonance with the capacitor C1 thereby causing voltage at the point A to decrease in a sine wave, voltage at the point B to increase in a sine wave and voltage across the capacitor C1 to approach to −2VI. This operation is a voltage resonance mode.

In a state where voltage across the capacitor C1 −2VI (the high side is negative and the low side is positive), potential at the point B is VI and, therefore, voltage across the switching element S2 is zero. By turning on the switching element S2 in this state, turning on of the switching element S2 at a voltage zero state is realized.

In the above described manner, in the power supply circuit of FIG. 1, by properly controlling timings at which the switching elements S1 and S2 are alternately turned on and off, turning on of a switching element at a zero-voltage state and turning off of a switching element at a zero-current state are realized. Since the current flowing through the switching elements S1 and S2 is half of the half bridge type transformer, generation of heat can be prevented.

Figure 9:
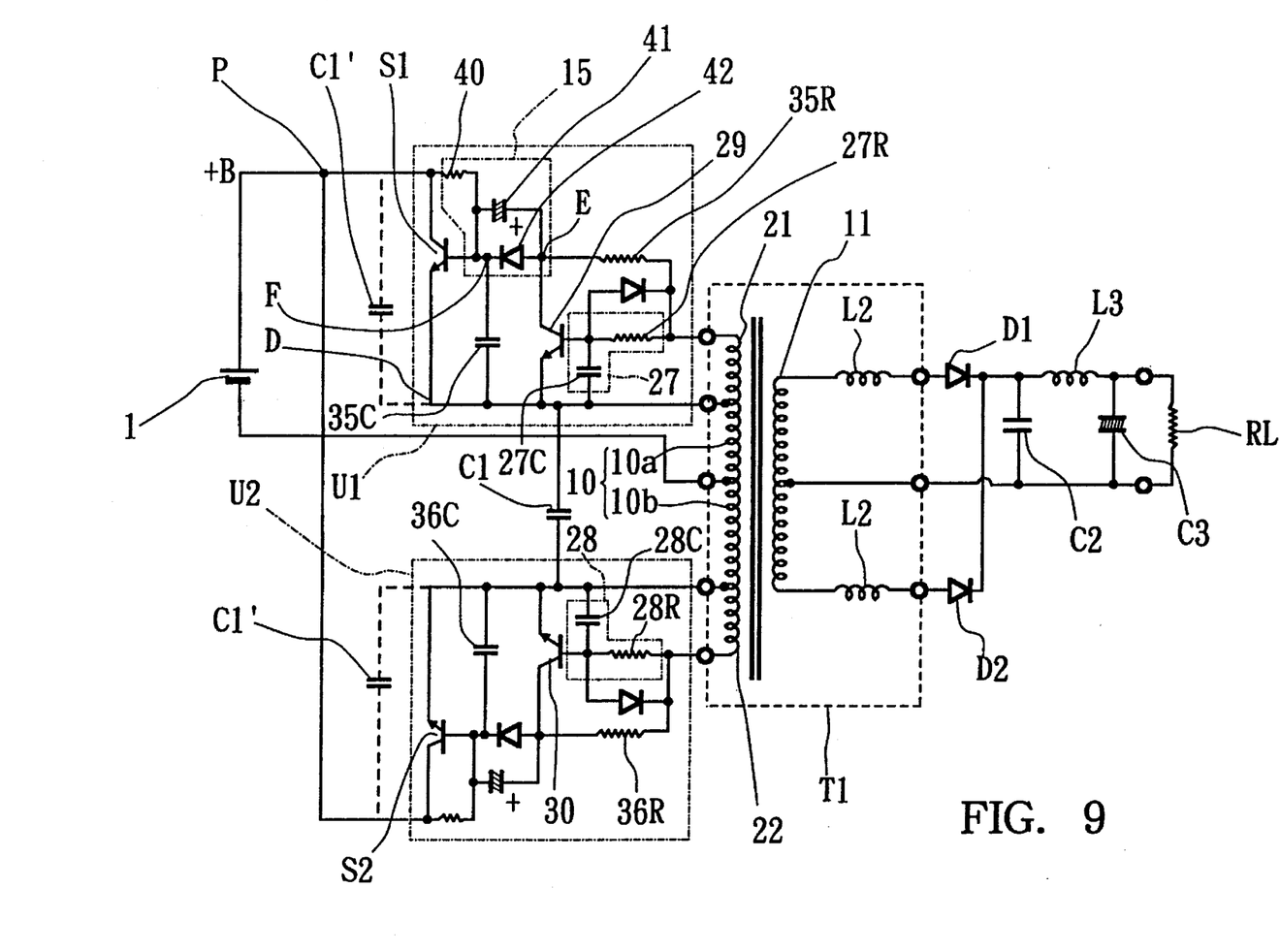
FIG. 9 is a circuit diagram showing a specific construction of the power supply circuit of FIG. 1 in which a start circuit and a self oscillation circuit are provided.

FIG. 9 is an embodiment of a power supply circuit which performs a switching operation based on self-oscillation and includes a start circuit. The same component parts as those of FIG. 1 are designated by the same reference characters.

The power supply circuit of FIG. 9 includes a circuit designated by U1 and a circuit designated by U2 which are turned on and off alternately. Two switching elements S1 and S2 are provided in series between the terminals of a primary winding 10. A dc power source 1 is connected between a connection point P of switching elements S1 and S2 and an intermediate tap Q of the primary winding.

Windings 21 (feedback winding), 22 (feedback winding) and 10 (primary winding) are wound on the same core of a transformer T1. The windings 10 and 21 and the windings 10 and 22 are respectively connected to each other in the direction of a positive feedback. A secondary winding 11 is wound on the secondary side of the transformer T1.

In the circuit U1, a transistor S1 is a main switching transistor, a transistor 29 is an auxiliary switching transistor and a capacitor 27C is a capacitor which constitutes a time constant circuit 27 with resistance 27R.

To a base of the main switching transistor S1 is connected a start circuit 15 including resistance 40, a capacitor 41 and a diode 42. Since the resistance 40 produces a power loss, resistance of a high value is used as the resistance 40. For obtaining a sufficiently strong start, a capacitor of a relatively large capacity is used as the capacitor 41. The circuit U2 is constructed in a manner similar to the circuit U1.

Starting of the power supply circuit of FIG. 9 will now be described. When the power source VI has been turned on, voltage at the primary winding 10 of the transformer T1 is zero and charged voltage of the capacitor 41 is also zero. Current flowing through resistance 40 is small. This current flows through resistance 35R while charging the capacitor 41, flows through the winding 21 and reaches a point D. This current, however, is not large enough to cause a large potential difference at the resistance 35R. Therefore, points D, E and F initially are substantially at the same potential and the main switching transistor S1 is in an off state.

As the capacitor 41 is charged with lapse of time and potential between points D and F has reached a base-emitter forward voltage of the main switching transistor S1, the transistor S1 enters an active region. At this time, a positive feedback loop of the transistor S1 from the feedback winding 21 to the base of the transistor S1 through the resistance 35R and the capacitor 41 is formed and the main switching transistor S1 is turned on in an accelerated manner and maintains the on state due to a large base current flowing from the winding 21 through the resistance 35R. Since current flowing from the resistance 35R to the capacitor for 41 is much larger than current which is reversely charged from the resistance 40, the potential at the capacitor 41 therefore becomes a forward potential of the diode 42 and maintains this forward potential of the diode 42 after starting. After starting, this diode 42 forms and maintains a positive feedback loop from the winding 21. After starting, therefore, oscillation is maintained and charging current from the winding 21 becomes predominant and the small reversely charging current from the resistance 40 becomes negligible, so that the main switching transistor 25 is not turned on erroneously due to the resistance 40 at a timing at which it should be turned off.

When the circuit U1 is on, the transistor S1 maintains the on s rate due to the positive feedback operation of the windings 21 and 10. Voltage across the capacitor 27C rises with time at a time constant of 27R ×27C and causes the transistor 29 to be turned on and the transistor S1 to be turned off upon lapse of a certain period of time. Upon turning off of the transistor S1, voltage across the terminals of the windings 21 and 22 are inverted and the circuit U2 is turned on.

After a predetermined period of time by the time constant 28R×28C of the time constant circuit 28, the transistor 30 is now turned on and the transistor S2 is turned off. An oscillation mode is formed in this manner and an operation of a switching inverter is performed.

A time constant circuit is respectively provided in each of the circuits U1 and U2 to delay the on timing of the main switching transistors S1 and S2 and thereby form off periods of the transistors S1 and S2 as shown in (f) and (g) of FIG. 8. These time constant circuits are formed by capacitors 35C and 36C connected between bases and collectors of the main switching transistors S1 and S2 which, in cooperation with the resistances 35R and 36R delay the on-timing by a predetermined period of time.

Voltage resonance is performed with the capacitor C1 and self inductance L1 of the primary winding 10 of the transformer T1. Current resonance is performed with leakage inductance L2 of the transformer T1 as viewed from the secondary side and the capacitor C2 provided on the secondary winding 11.

As the capacitor used for voltage resonance, the capacitor C1 may be substituted by split capacitors C1' and C1' which are provided between the respective terminals of the switching elements S1 and S2.

Diodes which are connected in parallel to the resistances 27R and 28R are provided for maintaining a balance between currents flowing to the switching elements S1 and S2. When an imbalance has taken place between these currents, this imbalance is corrected by changing switching duty while the switching frequency remains unchanged.

According to the power supply circuit of FIG. 9, a switching operation as shown in FIG. 8 is performed by self-oscillation and turning on of the switching element at a zero-voltage state and turning off of the switching element at a zero-current state are thereby realized. Since currents flowing through the switching elements S1 and S2 are half of the half bridge type transformer in the same manner as in the circuit of FIG. 1, generation of heat can be prevented. Further, while a collector of a conventional power transistor is made of a chip base, according to the circuit of FIG. 9, the switching elements S1 and S2 can be collector-grounded as shown in FIG. 9 and, therefore, a noise current flowing from the collector to the chip base through electrostatic capacity can be eliminated.

What is claimed is:

1. A power supply circuit comprising:

a transformer having a primary winding with an intermediate tap;

a switching circuit having two switching elements connected in series between terminals of the primary winding;

a dc power source connected between a connecting point of the two switching elements and the intermediate tap of the transformer;

dc output means for producing a dc output by rectifying and smoothing a secondary output of the transformer;

parallel resonance circuit comprising a primary self inductance of the transformer and a capacitor provided on a primary side of the transformer and being provided in parallel to voltage produced at an output terminal of the switching circuit;

series resonance circuit comprising a leakage inductance between primary and secondary sides of the transformer and a capacitor provided on a secondary side of the transformer and being formed in series to current flowing to the output terminal of the switching circuit; and switching control means for turning on and off the two switching elements of the switching circuit alternately and intermittently, wherein a dc output is provided from resonance current of the series resonance circuit by the dc output means and potential at the output terminal of the switching circuit is caused to change from one potential to another by using parallel resonance voltage of the parallel resonance circuit so that switching operations of the switching elements of the switching circuit are performed substantially at a zero-voltage state or a zero-current state and harmonic contents contained in operating voltage and operating current are respectively reduced.

2. A power supply device as defined in claim 1 wherein said switching control means turns on and off the switching elements of the switching circuit by self-oscillation and said switching control means comprises feedback windings respectively connected to the primary winding in a direction of a positive feedback and respectively connected between both terminals of the switching element.

\* \* \* \* \*